United States Patent
Caldwell et al.

(10) Patent No.: US 11,300,584 B2
(45) Date of Patent: Apr. 12, 2022

(54) OPTICAL AIR DATA SYSTEMS AND METHODS

(71) Applicant: OPHIR CORPORATION, Littleton, CO (US)

(72) Inventors: Loren M. Caldwell, Fort Collins, CO (US); Phillip E. Acott, Fort Collins, CO (US); Martin O'Brien, Conifer, CO (US)

(73) Assignee: OPHIR CORPORATION, Littleton, CO (US)

( * ) Notice: Subject to any disclaimer, the term of this patent is extended or adjusted under 35 U.S.C. 154(b) by 415 days.

(21) Appl. No.: 16/315,618

(22) PCT Filed: Jul. 6, 2017

(86) PCT No.: PCT/US2017/040814
§ 371 (c)(1),
(2) Date: Jan. 4, 2019

(87) PCT Pub. No.: WO2018/009599
PCT Pub. Date: Jan. 11, 2018

(65) Prior Publication Data
US 2019/0302141 A1  Oct. 3, 2019

Related U.S. Application Data

(60) Provisional application No. 62/358,924, filed on Jul. 6, 2016.

(51) Int. Cl.
*G01P 5/26* (2006.01)
*G01S 7/48* (2006.01)
(Continued)

(52) U.S. Cl.
CPC .............. *G01P 5/26* (2013.01); *G01S 7/4802* (2013.01); *G01S 7/4814* (2013.01);
(Continued)

(58) Field of Classification Search
CPC ........ G01S 17/58; G01S 17/88; G01S 7/4811; G01S 7/4802; G01S 7/4814;
(Continued)

(56) References Cited

U.S. PATENT DOCUMENTS 4,585,341 A * 4/1986 Woodfield ............. G01S 17/58
356/28.5
6,297,878 B1 * 10/2001 Miller ....................... G01P 5/26
356/141.1
(Continued)

FOREIGN PATENT DOCUMENTS

EP  2434296 A2  3/2012

OTHER PUBLICATIONS

Supplementary European Search Report for European Patent Application No. 17824848.0, dated Jan. 14, 2020.
(Continued)

*Primary Examiner* — Luke D Ratcliffe
(74) *Attorney, Agent, or Firm* — Lathrop GPM LLP

(57) ABSTRACT

An optical air data system for an air vehicle includes a LIDAR module and a data processing module. The LIDAR module is configured to emit at least three laser beams, not all located in a common plane, and perform LIDAR measurements of a backscattered component of each of the laser beams. The data processing module includes a processor and machine-readable instructions that, when executed by the processor, processes the LIDAR measurements to determine at least one optically-based air data parameter. The overlap between the laser beams and one or more fields of view of the LIDAR module may be within two meters from the LIDAR module to determine the at least one optically-based air data parameter at short range from the air vehicle.

23 Claims, 8 Drawing Sheets

(51) Int. Cl.
*G01S 7/481* (2006.01)
*G01S 17/58* (2006.01)
*G01S 17/95* (2006.01)

(52) U.S. Cl.
CPC .......... *G01S 7/4815* (2013.01); *G01S 7/4816* (2013.01); *G01S 17/58* (2013.01); *G01S 17/95* (2013.01); *G01S 7/4818* (2013.01); *Y02A 90/10* (2018.01)

(58) Field of Classification Search
CPC ...... G01S 7/4815; G01S 7/4816; G01S 17/95; G01S 7/4818; B64D 43/00; G01P 5/26; Y02A 90/10
See application file for complete search history.

(56) References Cited

U.S. PATENT DOCUMENTS

| | | |
|---|---|---|
| 7,999,926 B2 | 8/2011 | Perrie et al. |
| 8,072,584 B2 | 12/2011 | Caldwell et al. |
| 2003/0219252 A1* | 11/2003 | Hays .......... G01P 5/26 398/118 |
| 2006/0262324 A1* | 11/2006 | Hays .......... G01S 17/89 356/519 |
| 2008/0117433 A1 | 5/2008 | Hays |
| 2009/0051896 A1 | 2/2009 | Caldwell et al. |
| 2011/0219869 A1* | 9/2011 | Asahara .......... G01P 13/025 73/181 |
| 2013/0311013 A1* | 11/2013 | Rogers .......... G01S 17/58 701/14 |

OTHER PUBLICATIONS

International Patent Application No. PCT/US2017/040814; International Search Report and Written Opinion dated Sep. 29, 2017; 10 pgs.

\* cited by examiner

OPTICAL AIR DATA SYSTEMS AND METHODS

CROSS REFERENCE TO RELATED APPLICATIONS

This application a 35 U.S.C. § 371 filing of International Application No. PCT/US2017/040814, filed Jul. 6, 2017, which claims the benefit of priority from U.S. Provisional Patent Application Ser. No. 62/358,924, filed on Jul. 6, 2016, each of which is incorporated herein by reference in its entirety.

BACKGROUND

An Air Data System ("ADS") provides sensed telemetry informing pilots, navigators or Vehicle Management System computers of air parameter(s) affecting aircraft stability. These air parameters include, for example, air speed, air temperature and air pressure, each being useful for navigation and flight control. The ADS exists in many forms, for example, as mechanical, opto-mechanical or opto-electronic devices.

One mechanical ADS includes a Pitot tube, which affixes to the exterior of the aircraft. A Pitot-static system is a pneumatic measuring instrument that receives air external to the aircraft and determines air speed based upon air pressure. A typical Pitot-static system uses a pressure transducer to measure the pressure of air received through a plurality of holes. Determined air pressure is combined with air density measurements and air temperature measurements using the well-known Bernoulli equation to calculate air speed. Pilots and Vehicle Management Systems use this information for decisions regarding aircraft stability, flight control and navigation.

SUMMARY

In an embodiment, an optical air data system for an air vehicle includes a LIDAR module and a data processing module. The LIDAR module is configured to emit at least three laser beams, not all located in a common plane, and perform LIDAR measurements of a backscattered component of each of the laser beams. The data processing module includes a processor and machine-readable instructions that, when executed by the processor, processes the LIDAR measurements to determine at least one optically-based air data parameter. The overlap between the laser beams and one or more fields of view of the LIDAR module may be within two meters from the LIDAR module to determine the at least one optically-based air data parameter at short range from the air vehicle.

In an embodiment, a method for determining air data parameters for an air vehicle includes obtaining LIDAR measurements from at least three laser beams not located in a common plane, and processing the LIDAR measurements to determine at least one optically-based air data parameter.

DETAILED DESCRIPTION OF THE EMBODIMENTS

Figure 1:
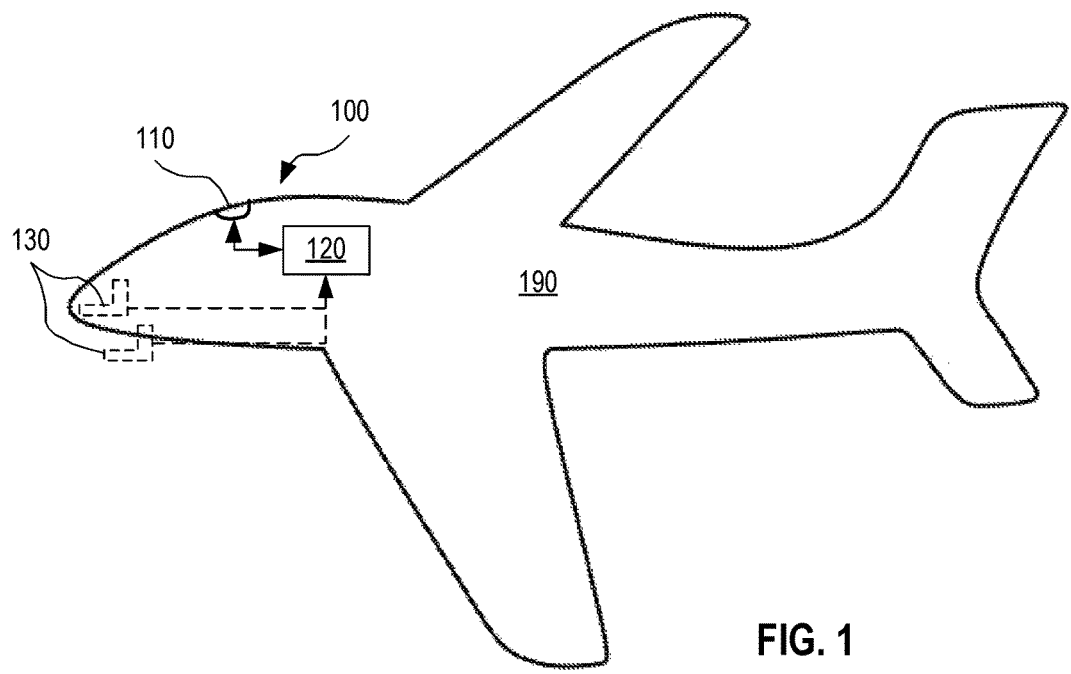
FIG. 1 illustrates an optical air data system implemented onboard an air vehicle, according to an embodiment.

The prior art ADS has limitations. With respect to the Pitot-static system, for example, if aircraft velocity is too low, the pressure transducer may lack requisite sensitivity to provide meaningful telemetry data, such that transducer signal noise or error may be greater than meaningful differences in pressure measurement. Alternatively, if the velocity is very high (e.g., supersonic), certain assumptions, such as those regarding incompressibility of air flow in Bernoulli's equation, are violated and the measurement is incorrect. Thus, such systems have a pressure lower limit for accurate speed sensing. Accordingly, Bernoulli's equation must be altered to compensate for various breached assumptions. This compensation process must continue in rapidly changing conditions of altitude and air density. Finally, prior art ADS cannot directly measure aircraft vertical and lateral airspeeds, but rely on angle of attack sensors or aircraft-distributed static pressure sensors. This method is highly inaccurate at high angles of attack or sideslip.

In addition, there are vulnerabilities to the prior art, conventional Pitot-static systems, particularly in icing and hazardous weather conditions. For example, Pitot tubes can become iced over in some hazardous weather conditions causing erroneous airspeed readings. This results in the loss of pilots' understanding of airspeed of the aircraft and safe operation of the aircraft. Also, these Pitot-static systems are compromised by events such as ground crew forgetting to remove the protective sock prior to flight, and insects building nests in the tube; thereby rendering the Pitot-static system useless. Hence, there is a need to augment, or replace, conventional (mechanical) air data systems with a system such as an Optical Air Data System in order to increase the reliability and availability of measured air data parameters.

One improvement is an Optical Air Data System ("OADS"), which uses light to determine parameters of air speed. The optical air data system transmits light into the atmosphere and receives light back that is reflected, or "backscattered", from aerosols and air molecules toward the aircraft. Aerosols are fine solids and/or liquid particles suspended in air and molecules include nitrogen and oxygen and other atmospheric constituents. The optical air data systems may also measure the Doppler effect, receiving the backscattered light and measuring return frequency to determine speed.

However, an optical air data system that relies solely on aerosol scattering is unreliable because of varying aerosol distributions. For example, aerosol distribution varies significantly with altitude and cloud content. In addition, some regions of the atmosphere contain too few aerosols to enable reliable air data measurements. Thus, aerosol-based OADS cannot determine the air speed at all altitudes frequented by modern aircraft. Finally, an OADS that relies solely on aerosol scattering cannot determine air temperature or air pressure. Air temperature and pressure are critical air data parameters for determining air density and Mach number. Hence, there is a need to improve optical air data systems and methods that rely solely on aerosol scattering.

Disclosed herein are optical air data systems that at least partially overcome the problems discussed above. Each of the optical air data systems utilize a multi-beam light detection and ranging (LIDAR) module to obtain air data measurements and provides an air data solution that shares no measurement fundamentals of the Pitot static systems. The LIDAR module shares no measurement fundamentals of the Pitot static systems and thus provides air data measurements that are both redundant to the conventional air data system and have no failure modes common to the conventional air data system.

In one implementation of the presently disclosed optical air data systems, the optical air data system may augment, or replace, conventional air data sensors by providing all air data parameters, atmospheric temperature, atmospheric pressure, and full vector velocity (true airspeed), in all weather conditions and at all altitudes. In implementations configured to augment a conventional air data system, the optical air data system may (a) be communicatively coupled with the conventional air data system, (b) include the conventional air data system, or (c) be communicatively coupled with a flight control system that is also communicatively coupled with the conventional air data system. In certain embodiments, the optical air data systems disclosed herein offer an increased availability of air data measurements as compared to prior art air data systems. Optionally, the LIDAR module of the presently disclosed optical air data systems is capable of obtaining measurements at a short range such as within one or a few meters from the aircraft, thereby improving the availability of optical air data in inclement weather conditions.

Figure 2:
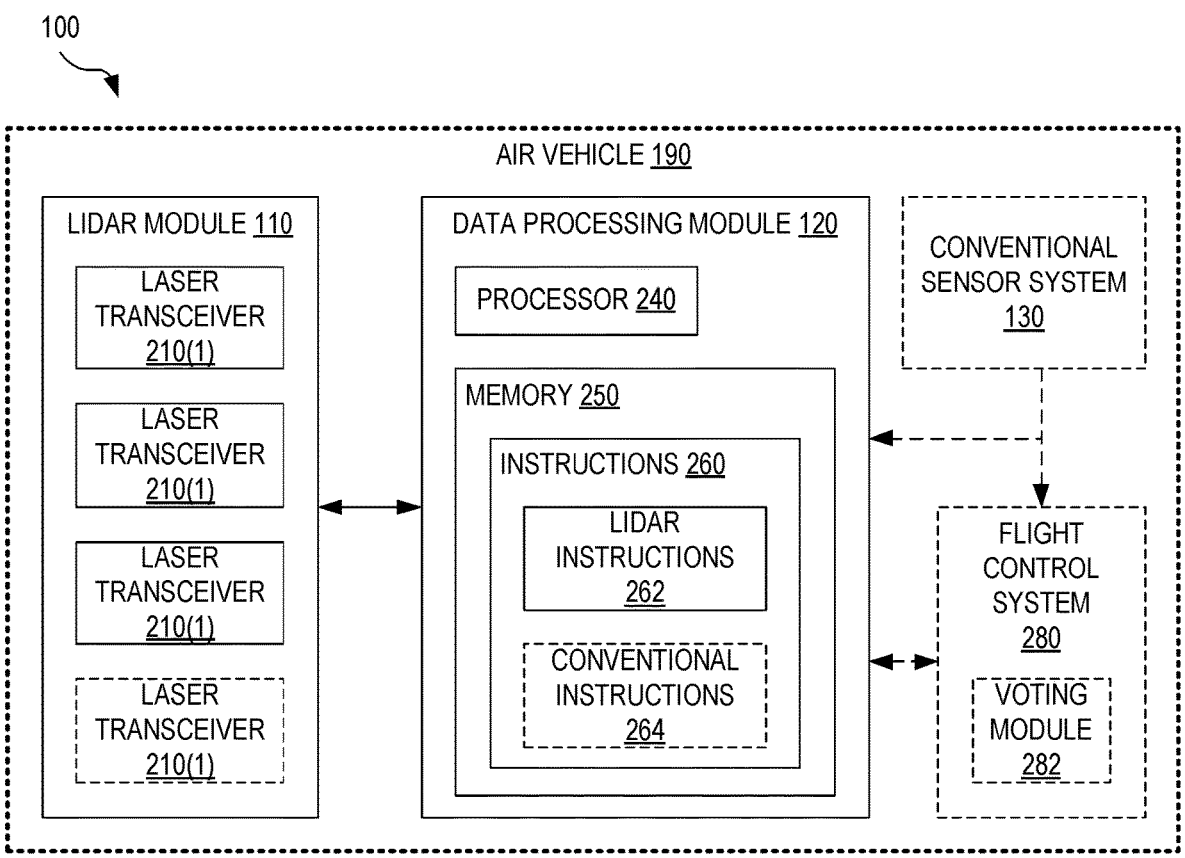
FIG. 2 is a schematic block diagram of the optical air data system of FIG. 1, according to an embodiment.

FIGS. 1 and 2 illustrate one exemplary optical air data system (OADS) 100 implemented onboard an air vehicle 190. Air vehicle 190 may be an airplane, helicopter, or other airborne vehicle. FIG. 1 shows OADS 100 in an exemplary use scenario, as implemented onboard an airplane. FIG. 2 is a schematic block diagram of OADS 100. FIGS. 1 and 2 are best viewed together.

OADS 100 includes a LIDAR module 110 and a data processing module 120. LIDAR module 110 includes (a) three or more laser transceivers 210 that emit three or more laser beams and detect components of the laser beams back-reflected by the atmosphere. The back-reflected components may be produced by Mie scattering off of aerosols (aerosol scattering) and/or Rayleigh scattering off of molecules (molecular scattering). In an embodiment, each laser transceiver 210 is sensitive to both aerosol scattering and molecular scattering. In this embodiment, LIDAR module 110 operates efficiently in all aerosol loading conditions from high aerosol loading environments such as found in the atmospheric boundary layer, clouds and icing events, and in environments where there is little to no aerosols such as at common aircraft operational altitudes of 30,000 feet or above. In upper altitudes there is commonly just molecular scattering present, and LIDAR systems sensitive to aerosol scattering only may fail. The use of a Rayleigh/Mie LIDAR module ensures measurement of all air data parameters, at all aircraft operational altitudes from ground level to transport aircraft cruise altitudes and higher, generally with high data availability and no data dropouts or sensor failures.

Data processing module 120 processes measurements of the back-reflected components to generate air data parameters such as airspeed, atmospheric pressure, atmospheric temperature, aircraft orientation such as angle of attack and angle of sideslip, and/or fractional aerosol scattering. LIDAR module 110 is configured with three or more laser transceivers 210 emitting laser beams along three or more different propagation directions, respectively, which are not all coplanar. By virtue of this geometry, OADS 110 is capable of determining the full vector velocity of air vehicle 190 in the coordinate frame of air vehicle 190, for example resolved in terms of axial velocity (also known as waterline velocity), lateral velocity, and vertical velocity.

The three or more laser transceivers 210 may include three or more respective lasers to generate the laser beams individually or, alternatively, include appropriate optics to generate the three or more laser beams from a smaller number of lasers, such as one laser. Similarly, the three or more laser transceivers 210 may include one photodetector for each laser beam or, alternatively, the three or more laser transceivers 210 may share a smaller number of photodetectors. Although FIG. 2 shows only one optional laser transceiver 210 in excess of three, LIDAR module 110 may include several laser transceivers 210 in excess of three, without departing from the scope hereof.

Data processing module 120 includes a processor 240 and a non-transitory memory 250 containing machine-readable instructions 260. Memory 250 is for example a non-volatile memory. Data processing module 120 may be implemented in the form of a computer or a microprocessor. Instructions 260 include LIDAR instructions 262 that, upon execution by processor 240 process measurements received from LIDAR module 110 to determine one or more air parameters such as airspeed, atmospheric pressure, and/or temperature. For this purpose, LIDAR instructions 262 may include algorithms such as those disclosed in U.S. Pat. No. 8,072,584 which is incorporated herein by reference in its entirety. Data processing module 120 may be communicatively coupled with a flight control system 280 onboard air vehicle 190, in which case flight control system 280 may utilize air parameters generated by data processing module 120.

In certain implementations, air vehicle 190 is further equipped with a conventional sensor system 130, for example a Pitot static system. In these implementations, air vehicle 190 may utilize air data received from both of OADS 100 and conventional sensor system 130. In one embodiment, OADS 100 includes conventional sensor system 130. In this embodiment, instructions 260 may include conventional instructions 264 that upon execution by processor 240 process measurements received from conventional sensor system 130 to determine one or more air parameters such as airspeed, atmospheric pressure, and/or temperature. In another embodiment, OADS 100 and conventional sensor system 130 are communicatively coupled with flight control system 280. Flight control system 280 may include a voting module 282 that collectively considers both optically-based air data from data processing module 120 and conventional air data from conventional sensor system 130, to select the air data expected to be of better quality and accuracy. Voting module 282 may include machine-readable instructions encoded in a non-transitory memory within flight control system 280, which, when executed by a processor within flight control system 280, applies a voting algorithm to the air data to select the most accurate air data and/or give more weight to air parameters expected to be more accurate.

Figure 3:
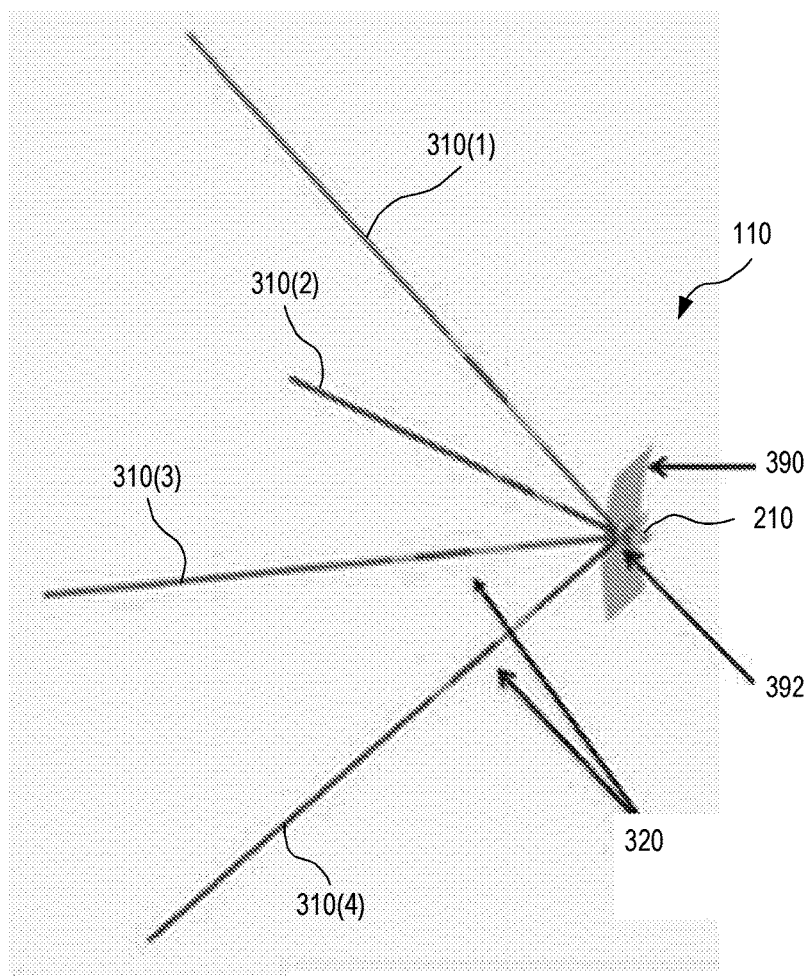
FIG. 3 shows one exemplary configuration of a LIDAR module, of the optical air data system of FIG. 1, implemented onboard air vehicle, according to an embodiment.

FIG. 3 shows one exemplary configuration of LIDAR module 110 implemented onboard air vehicle 190. Laser transceivers 210 are positioned behind a window 392. Window 392 may be conformed to the outer mold line of the local surface 390 of air vehicle 190. Laser transceivers 210 emit at least three laser beams 310. These at least three laser beams 310 are not all coplanar. This configuration ensures the determination of lateral and vertical velocity, as well as axial line-of-flight velocity (waterline velocity) yielding a true airspeed measurement. Providing aircraft-waterline, aircraft-vertical and aircraft-lateral velocities, along with metrics based on these measurements provides aircraft-control data not previously available from conventional air data systems. Data processing module 120 may relay this information to flight control system 280 for improved aircraft control and thus increased flight safety and ride comfort.

In one example of the configuration shown in FIG. 3, each laser beam 310 propagates in a direction that is at approximately a 30-60 degree angle, such as approximately 45 degrees, away from the normal vector of LIDAR module 110. The normal vector of LIDAR module 110 may be oriented along the longitudinal axis of air vehicle 190.

The range from which measurements are obtained, that is the distance from LIDAR module 110 to the scattering sources producing the back-reflected laser light processed by OADS 100, is determined by the overlap between laser beams 310 and the field of view of laser transceivers 210. In one embodiment, LIDAR module 110 is configured such that this overlap is about one or a few meters away from LIDAR module 110. In one such example, the overlap is optimal at about one meter from LIDAR module 110 and may span approximately the range 0.5-2 meters from LIDAR module 110. This configuration enables obtaining optically-based air parameters from the immediate proximity of air vehicle 190, which reduces the risk of weather-induced failure. For example, this short range configuration ensures that OADS 100 can provide valid air data even in conditions where long range measurements would fail, such as when air vehicle 190 is in torrential rain, fog, or clouds and long range signals would be extinguished. Furthermore, OADS 100 is not susceptible to icing, as conventional systems are, because LIDAR module 110 is mounted internal to the air vehicle, behind window 392 that is conformal to the outer mold line of air vehicle 190. LIDAR module 110 does not need to be mounted on a leading edge of air vehicle 190, which is commonly considered an icing zone. Thus, OADS 100 is much less susceptible to aircraft icing problems than conventional air data sensors and, at least in its short range configuration, OADS 100 provides valid air data in conditions otherwise associated with icing.

In certain embodiments, laser transceivers 210 emit four or more laser beams 310 propagating along four different directions, respectively, which provide additional redundancy beyond that of a three-beam system. In one example, OADS 100 includes four laser beams 310, wherein each laser beam 310 propagates in a direction that is at 30-60 degrees, such as approximately 45 degrees, to the normal vector of LIDAR module 110. Laser beams 310 may be directed toward points located at each 90 degrees on a circle centered about the normal vector of LIDAR module 110 in front of LIDAR module 110. That is, laser beams 310 are substantially equidistant on this circle. This configuration provides adequate distance between the sensor fields of regard (zones of overlap between laser beams 310 and the field of view of laser transceivers 212) to ensure that solar saturation, specular glare from water or metallic surfaces, etc., cannot simultaneously prohibit measurements from multiple laser transceivers 210. Thus, additional laser beams 310 in excess of three improves the reliability of OADS 100 and availability of air parameters produced therefrom. In addition, the additional laser beams 310 in excess of three provide additional measurements providing additional data and, in turn, additional accuracy over the measurements obtained from the first three laser beams 310. This increases the overall measurement accuracy and provides some redundancy.

Referring again to FIG. 2, when processing measurements from three or more than three laser transceivers 210, data processing module 120 may fit air parameters to the measurements. LIDAR instructions 262 may include fitting instructions for this purpose.

In addition, LIDAR instructions 262 may utilize the known geometry of each laser beam 310 relative to each other and air vehicle 190, to generate valid and useful air parameters (e.g. airspeed, temperature and/or pressure) even when only one or two laser transceivers 210 produces valid measurements. These air parameters may be somewhat degraded as compared to those obtained with three or more fully functioning laser transceivers 210. However, OADS 100 may obtain, for example, waterline velocity (or an estimate thereof), temperature, and pressure based upon a single laser transceiver 210. The waterline velocity determination may utilize a predetermined direction of motion of air vehicle 190. In one example, OADS 100 determines the waterline velocity from a single laser transceiver 210 based upon the assumption that air vehicle 190 is predominantly moving in its axial direction. This resilience to transceiver failure significantly increases critical data availability from OADS, thus improving system safety and data reliability.

Without departing from the scope hereof, data processing module 120 may be a stand-alone system configured to receive LIDAR measurements from a third-party LIDAR module generating at least three laser beams 310. Furthermore, LIDAR instructions 262 may be encoded in non-transitory memory and supplied as a stand-alone software product configured for installation on a third-party computer system.

Figure 4:
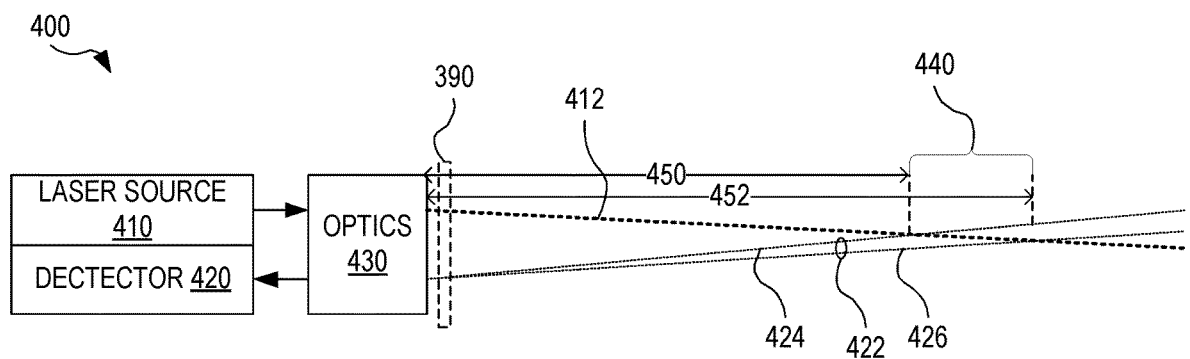
FIG. 4 illustrates a laser transceiver, according to an embodiment.

FIG. 4 illustrates one exemplary laser transceiver 400 that includes a laser source 410 and a detector 420. Laser source 410 is, for example, a laser or the output end of an optical fiber receiving laser light at its input end. Laser transceiver 400 further includes optics 430. Optics 430 may include several optical elements. Laser transceiver 400 is an embodiment of laser transceiver 210.

In operation, optics 430 receives laser light from laser source 410 to form laser beam 412 which is an example of laser beam 310. Optics 430 further collects light from a field of view 422 (schematically indicated as a cone between lines 424 and 426) and directs this collected light to detector 420. Field of view 422 coincides with laser beam 412 within an overlap region 440 extending between distances 450 and 452 from optics 430, such that at least some of the light detected by detector 420 is a component of laser beam 412 backscattered within overlap region 440. Although FIG. 4 shows overlap region 440 as having distinct limits at distances 450 and 452, it is understood that overlap region 440 may have more gradual boundaries, for example as associated with Gaussian beam properties. In an embodiment, overlap region 440 is about one or a few meters away from optics 430. For example, transceiver 400 may be implemented in LIDAR module 110 behind window 392 such that overlap region 440 spans approximately the range 0.5-2 meters from window 392.

Figure 5:
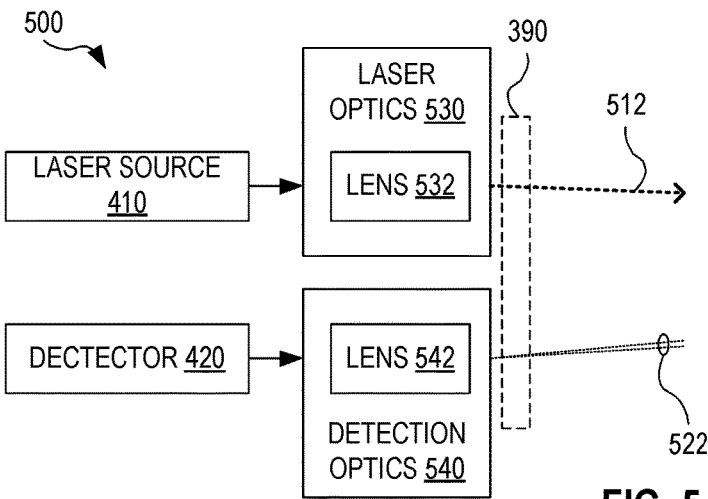
FIG. 5 illustrates a laser transceiver with separate optical pathways for outputting laser light and detecting backscattered light, according to an embodiment.

FIG. 5 illustrates one exemplary laser transceiver 500 with separate optical pathways for outputting laser light and detecting backscattered light. Laser transceiver 500 is an embodiment of laser transceiver 400. Laser transceiver 500 includes laser source 410 and detector 420. Laser transceiver 500 further includes laser optics 530 and detection optics 540. Laser optics 530 includes a lens 532, and detection optics 540 includes a lens 542. One or both of laser optics 530 and detection optics 540 may include additional optical elements, such as one or more mirrors and/or filters. Together, laser optics 530 and detection optics 540 form an embodiment of optics 430.

In operation, laser optics 530 receives laser light from laser source 410 and forms laser beam 512. Laser beam 512 is an example of laser beam 412. Lens 532 collects laser light outputted by laser source 410 and collimates, or nearly collimates, this laser light to form laser beam 512. Detection optics 540, at least by virtue of lens 542, has a field of view 522 (an example of field of view 422). Laser optics 530 and detection optics 540 are cooperatively configured such that field of view 522 overlaps with laser beam 512 within overlap region 440. For clarity of illustration, overlap region 440 is not shown in FIG. 5. Lens 542 collects light from field of view 522, and detection optics 540 directs this collected light to detector 420. When implemented in LIDAR module 110, laser optics 530 and detection optics 540 are positioned behind window 392.

Figure 6:
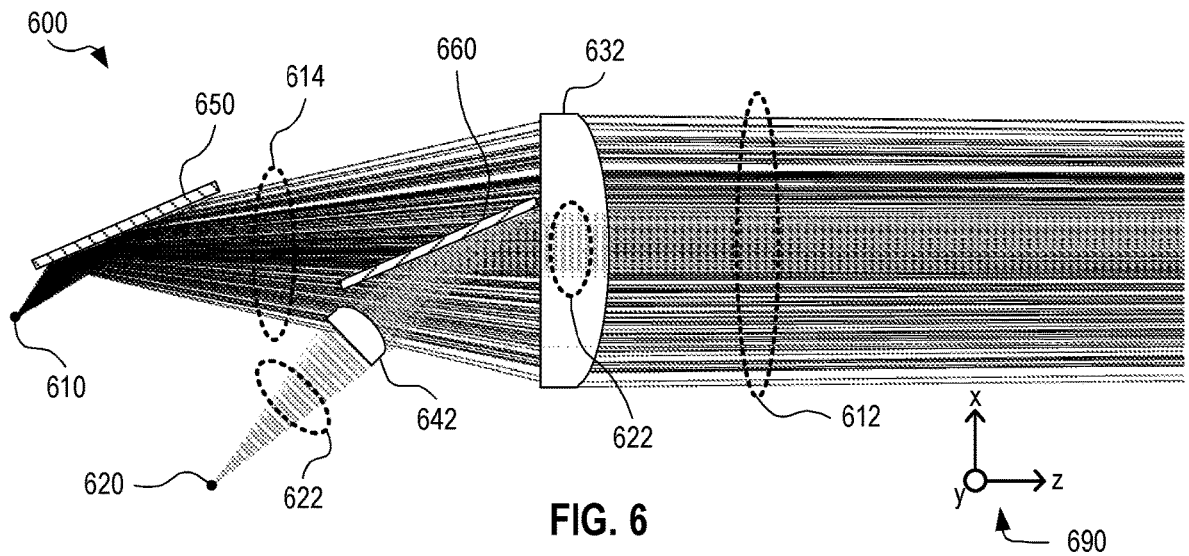
FIGS. 6 and 7 illustrate the optical configuration of a laser transceiver, according to an embodiment.
Figure 7:
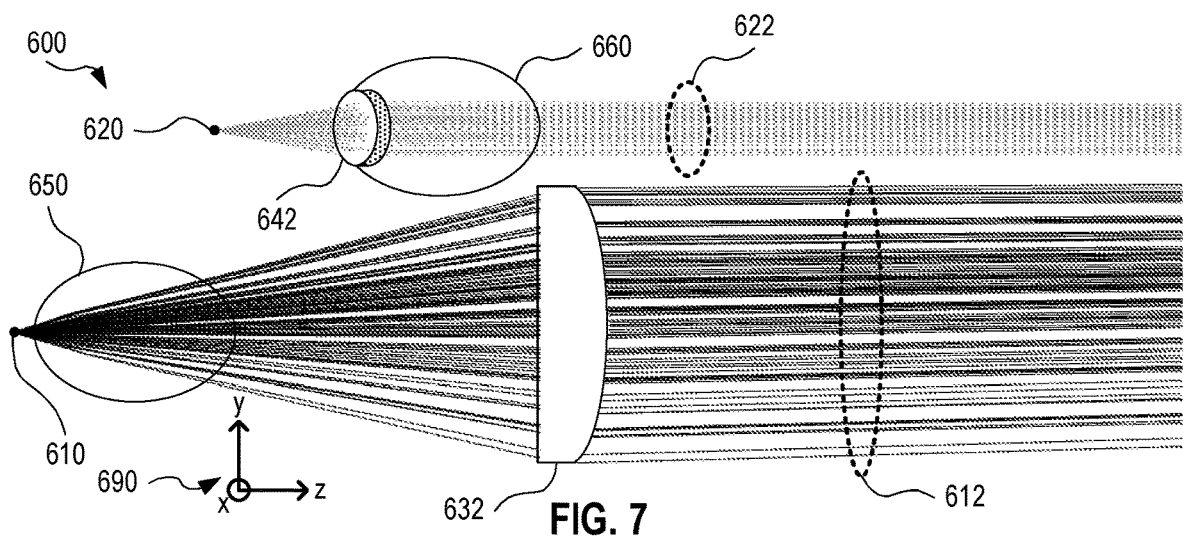

FIGS. 6 and 7 illustrate the optical configuration of one exemplary laser transceiver 600. FIGS. 6 and 7 show respective mutually orthogonal views of the optical configuration of laser transceiver 600, as indicated by coordinate system 690. FIGS. 6 and 7 further show results of a ray tracing simulation for laser transceiver 600. FIGS. 6 and 7 are best viewed together in the following description. Laser transceiver 600 has separate optical pathways for laser beam generation and backscattered light detection. Laser transceiver 600 is an embodiment of laser transceiver 500.

In the laser beam generation pathway, laser transceiver 600 includes a laser source 610, a mirror 650, and a collimation lens 632. Laser source 610 is, for example, a laser or the output end of an optical fiber transmitting laser light coupled into the optical fiber at its input end, wherein the output end of the optical fiber may be equipped with a coupling lens. In operation, mirror 610 directs laser light 614 outputted by laser source 610 to collimation lens 632, and collimation lens 632 collimates (or nearly collimates) laser light 614 to form a laser beam 612. Laser beam 612 is an example of laser beam 512.

In the backscattered light detection pathway, laser transceiver 600 includes a mirror 660, a collection lens 642, and a detector having a receiving end 620. In one embodiment, receiving end 620 is one end of an optical fiber (optionally equipped with a coupling lens), and the other end of the optical fiber is coupled directly or indirectly to a photodetector. In another embodiment, receiving end 620 is a photosensitive portion of a photodetector. Collection lens 642 defines the size of field of view 422 (see FIG. 4) of receiving end 620. Collection lens 642 and mirror 660 are configured to coincide field of view 422 of receiving end 620 with laser beam 612 within overlap region 440 (see FIG. 4). In operation, mirror 660 redirects light 622 toward collection lens 642, and collection lens 642 focuses light 622 onto receiving end 620. Light 622 includes light backscattered from laser beam 612 within overlap region 440.

For clarity of illustration, FIGS. 6 and 7 do not explicitly show field of view 422. Instead, field of view 422 is indicated by the bundle of rays forming light 622. Overlap region 440 is outside the view of FIGS. 6 and 7. However, laser beam 612 propagates somewhat in the positive y-direction (most clearly seen in FIG. 7) and therefore does intersect field of view 422, as indicated by light 622, outside the view of FIGS. 6 and 7.

In one embodiment, collimation lens 632 has a diameter of 25 millimeters (mm) and an effective focal length of 50 mm, and collection lens 642 has a diameter of 6.5 mm and an effective focal length of 18.4 mm. One or both of collimation lens 632 and collection lens 642 may be an aspheric lens.

Figure 8:
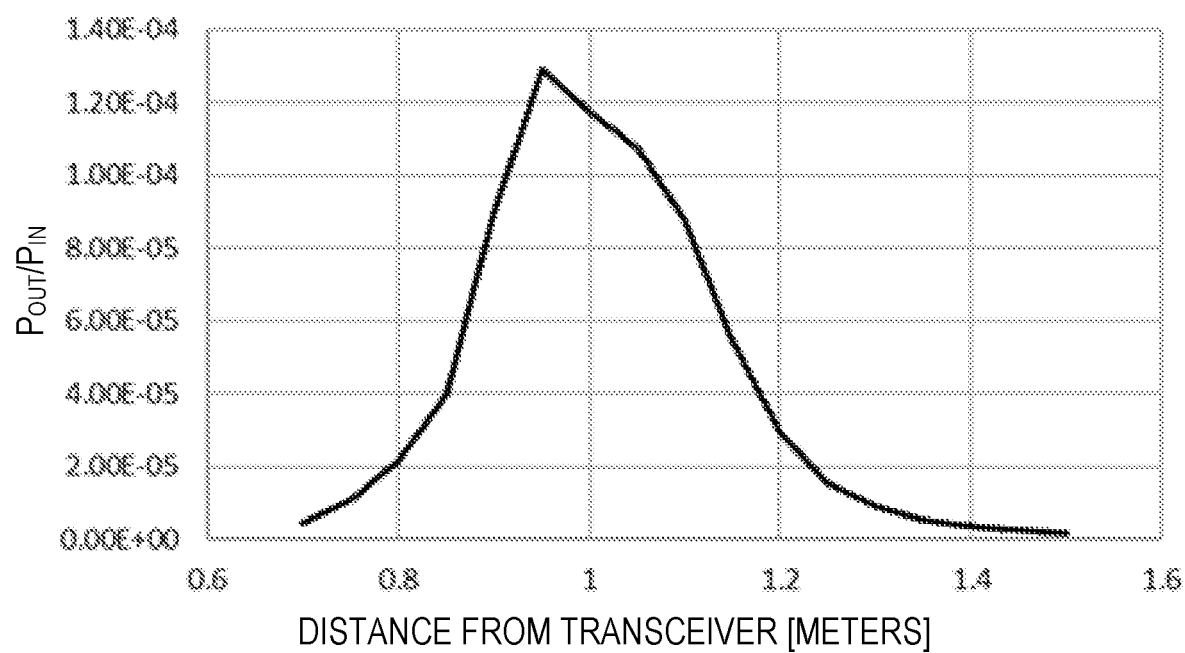
FIG. 8 shows an exemplary overlap function for the laser transceiver of FIGS. 6 and 7.

FIG. 8 shows an exemplary overlap function for laser transceiver 600. FIG. 8 plots the fraction of the power of laser beam 612 backscattered and detected by transceiver 600, as light 622, as a function of distance from laser transceiver 600. The range of distances wherein the overlap function provides satisfactory signal quality for the detected light 622 defines overlap region 440. The FIG. 8 overlap function peaks at a distance of approximately 0.95 meters from laser transceiver 600. In one example, the FIG. 8 overlap function defines an overlap region 440 spanning the range from about 0.8 meters to 1.2 meters from laser transceiver 600.

Figure 9:
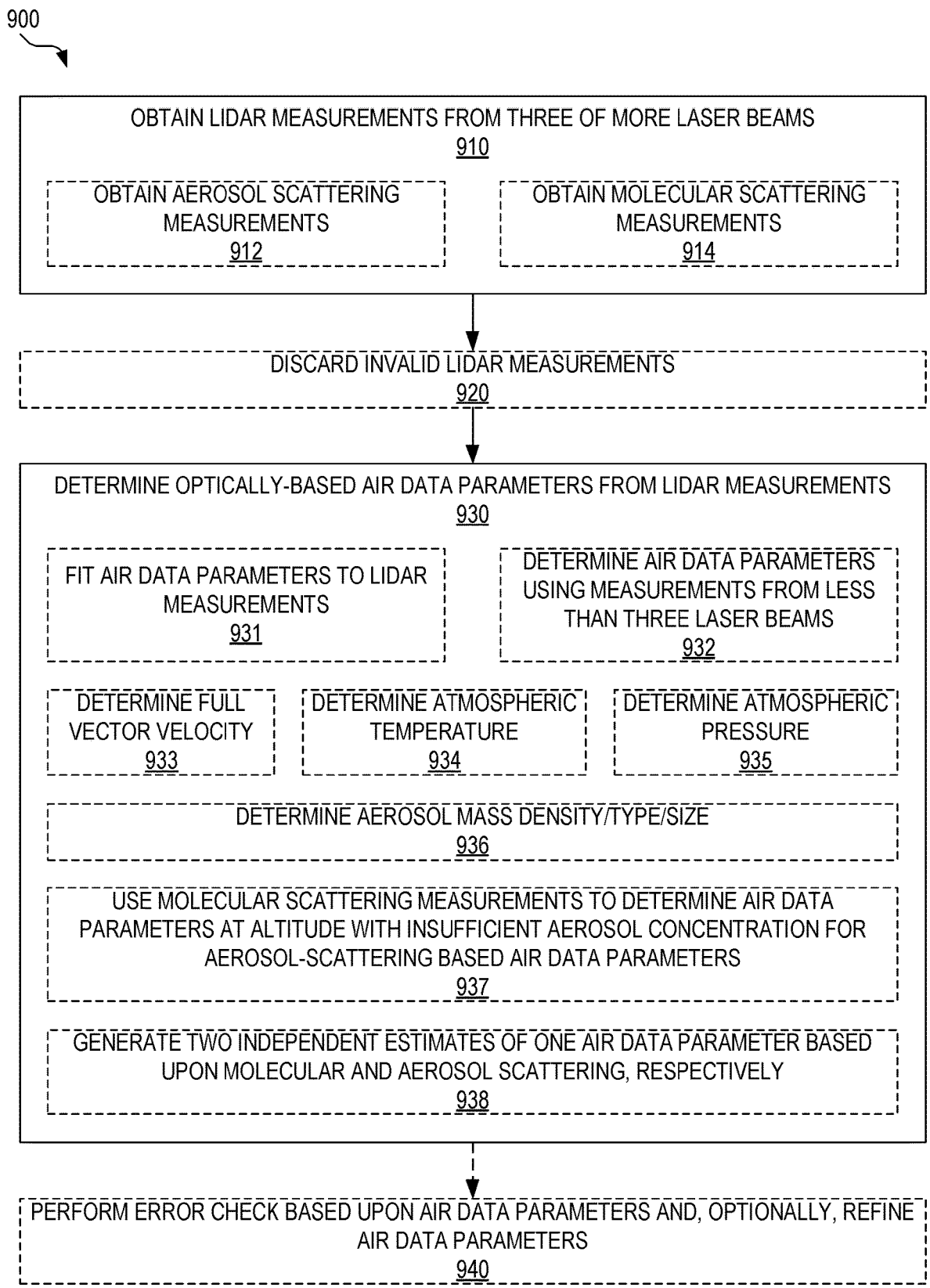
FIG. 9 illustrates a method for determining air data parameters based upon optical measurements, according to an embodiment.

FIG. 9 illustrates one exemplary method 900 for determining air data parameters from optical measurements provided by a LIDAR module having at least three different laser beams that are not all in a common plane. Method 900 may be performed by OADS 100, for example to determine air data parameters for air vehicle 190.

In a step 910, method 900 obtains LIDAR measurements from three or more laser beams. In one example of step 910, OADS uses three or more laser transceivers 210 to carry out LIDAR measurements. In one embodiment, step 910 includes a step 912 of obtaining aerosol scattering measurements. In one example of step 912, laser transceivers 210 are sensitive to Mie scattering and aerosol scattering measurements are obtained for example as discussed in U.S. Pat. No. 8,072,584. In another embodiment, step 910 includes a step 914 of obtaining molecular scattering measurements. In one example of step 914, laser transceivers 210 are sensitive to Rayleigh scattering and molecular scattering measurements are obtained for example as discussed in U.S. Pat. No. 8,072,584. In yet another embodiment, step 910 includes both step 912 and step 914. In one example of this embodiment, laser transceivers 210 are sensitive to both Mie and Rayleigh scattering, and aerosol and molecular scattering measurements are obtained for example as discussed in U.S. Pat. No. 8,072,584.

In an optional step 920, method 900 discards invalid LIDAR measurements. In one example of step 920, data processing module 120 discards measurements from one or more laser transceivers 210 due to the transceiver malfunctioning or the conditions being outside the proper operating range of the transceiver. For example, data processing module 120 may process measurements received from one laser transceiver 210 and determine that this laser transceiver is saturated by sun light, whereupon data processing module 120 disregards measurements received from this laser transceiver. LIDAR instructions 262 may include instructions for determining if a laser transceiver 210 is saturated or otherwise malfunctioning.

In a step 930, method 900 determines air data parameters from the LIDAR measurements. In one example of step 930, data processing module 120 processes LIDAR measurements received from LIDAR module 110 to determine air data parameters. Step 930 may include a step 931 of fitting air data parameters to the LIDAR measurements, for example using a fitting technique known in the art. Step 931 may, but need not, utilize LIDAR measurements from more than three laser transceivers 210. Step 930 may include a step 932 of determining air data parameters from less than three laser transceivers.

Step 930 may include one, more, or all of steps 933, 934, and 935. Step 933 determines the full vector velocity (true airspeed) of air vehicle 190. Step 934 determines the atmospheric temperature at air vehicle 190. Step 935 determines the atmospheric pressure at air vehicle 190. Step 933 may rely on aerosol scattering measurements and/or molecule scattering measurements, and step 933 may be performed as discussed in U.S. Pat. No. 8,072,584. Each of steps 934 and 935 may rely on molecular scattering measurements and may be performed as discussed in U.S. Pat. No. 8,072,584. Optionally, step 930 includes a step 936 of determining the aerosol mass density, type, and/or size. Step 936 relies on aerosol scattering measurements. This aerosol characterization information may be used in federated voting architectures between conventional and OADS sensor measurements. In addition, this data may be used to provide information about atmospheric conditions not measurable by conventional air data systems. The aerosol mass density, which in combination with atmospheric temperature (for example determined in step 934), enables determination of icing conditions or indication of potential icing zones, as well as volcanic ash, clouds and icing layers.

In certain embodiments, step 930 includes a step 937 of using molecular scattering measurements to determine air data parameters at altitudes with insufficient aerosol concentration for aerosol-scattering based air data parameters, for example at altitudes greater than 15,000 feet where the aerosol concentration generally is too low to generate adequate aerosol scattering measurements. Optionally, step 930 includes a step 938 of generating two independent estimates of the same air data parameter, for one or more of the air data parameters. For such an air data parameter, step 938 generates one estimate based upon aerosol measurements and another estimate based upon molecular scattering measurements.

Method 900 may further include a step 940 of performing error check(s) on air data parameters. Step 940 may use such error check(s) to refine the air data parameters outputted by method 900. For example, step 940 may compare two different estimates of one air data parameter, generated in step 938, to determine which one of these two air data parameters is more accurate. In addition, step 940 may utilize this comparison to obtain information about the atmospheric conditions and apply this information to refine, discard, or select other air data parameters. For example, step 940 may determine that the aerosol measurements are inaccurate, e.g., due to insufficient aerosol concentration, and based thereupon discard all aerosol measurements or discard all air data parameters based upon aerosol measurements. Step 940 may be performed by data processing module 120. The ability to measure airspeed via molecular scattering and aerosol scattering and the ability to distinguish between the two provide an additional capability for error checking in the case of inclement weather such as heavy rain. In another example, step 940 uses one air data parameter to evaluate the validity of another air data parameter. For example, one air data parameter may indicate atmospheric conditions under which another air data parameter is expected to be inaccurate.

Steps 920 and 930, and optionally 940, may be implemented in OADS 100 as LIDAR measurement instructions 262.

Without departing from the scope hereof, step 910 may be replaced by a step of receiving the LIDAR measurements from a LIDAR module. In this case, method 900 may be performed by data processing module 120 alone, and method 900 may be encoded in memory 250 as at least a portion of LIDAR instructions 262.

Although not shown in FIG. 9, method 900 may include a step of communicating the air data parameters to a flight control system, such as flight control system 280.

Figure 10A:
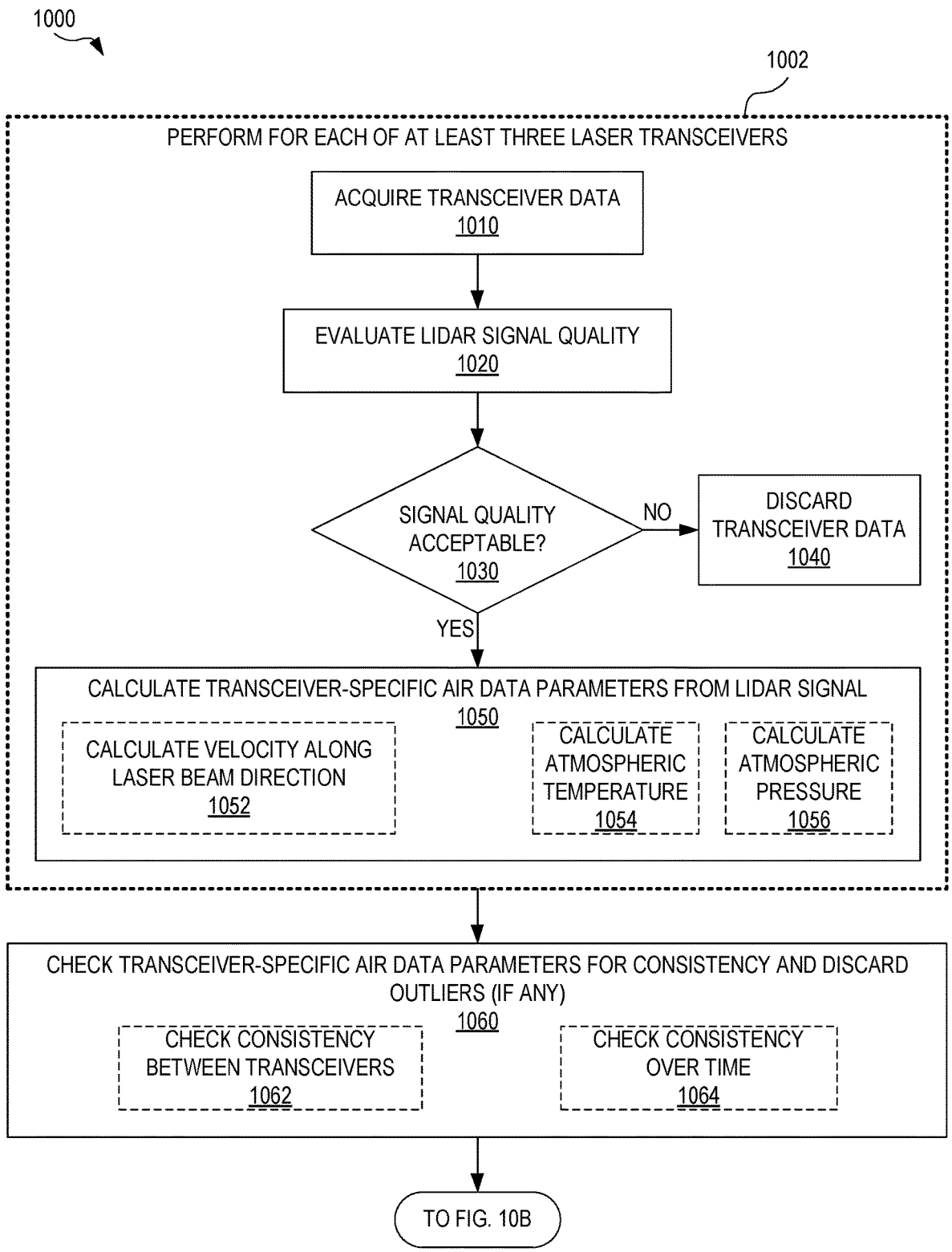
FIGS. 10A and 10B illustrate a method for determining air data parameters from LIDAR measurements while evaluating LIDAR signal quality and performing consistency checks to ensure that the resulting optically-based air data parameters are reliable, according to an embodiment.
Figure 10B:
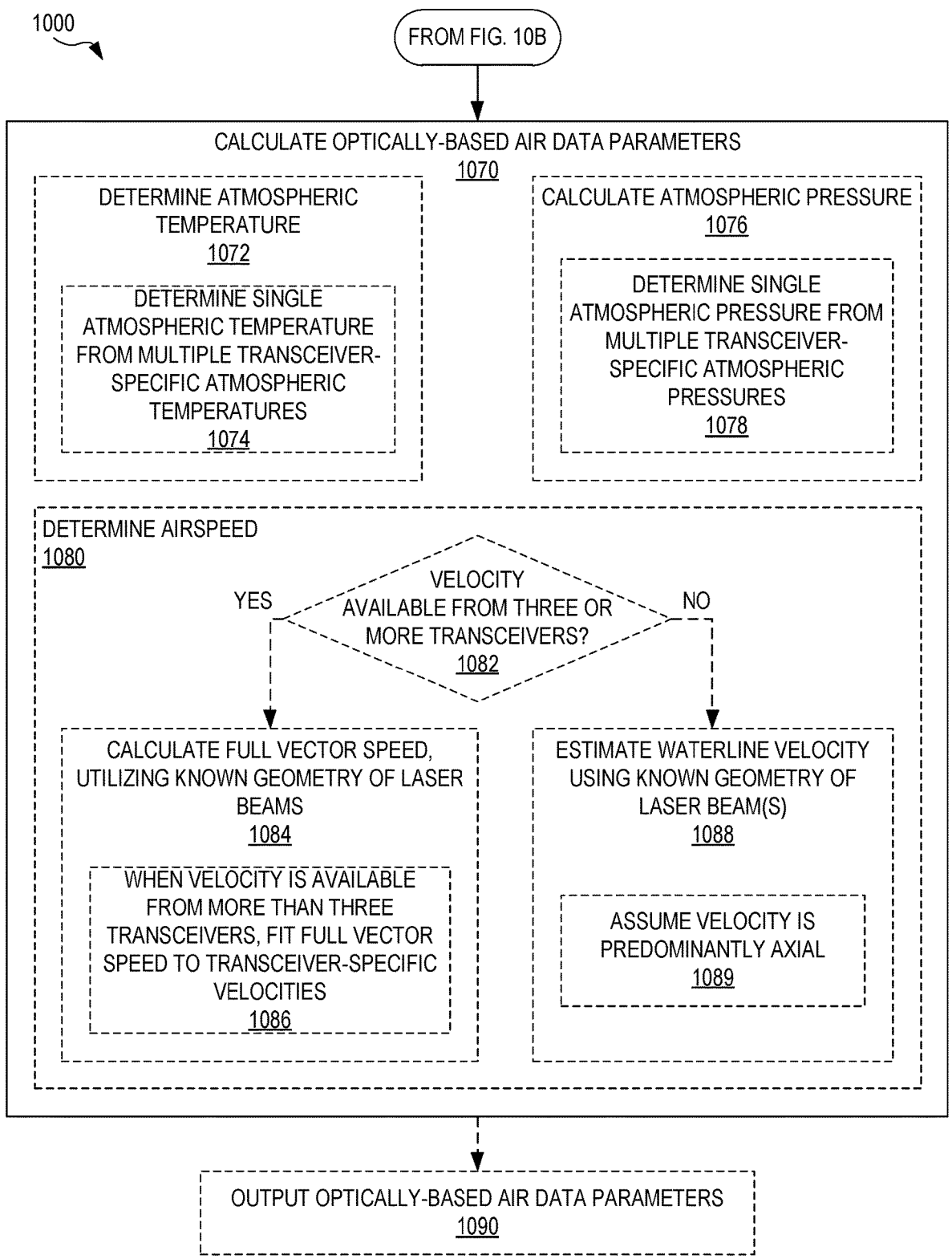

FIGS. 10A and 10B illustrate one exemplary method 1000 for determining air data parameters from LIDAR measurements while evaluating LIDAR signal quality and performing consistency checks to ensure that the optically-based air data parameters generated by method 1000 are reliable. Method 1000 is an embodiment of method 900, and may be performed by OADS 100, for example to determine air data parameters for air vehicle 190. FIG. 10A shows a first portion of method 1000, and FIG. 10B shows a second portion of method 1000. FIGS. 10A and 10B are best viewed together in the following description.

Method 1000 first performs a sub-method 1002 for each of at least three laser beams not all propagating in a common plane. In one example, method 1000 performs sub-method 1002 for each of three or more laser beams generated by laser transceivers 210 of OADS 100, such as laser beams 310 shown in FIG. 3.

Sub-method 1002 includes a step 1010 of acquiring transceiver data for the laser beam. In one example of step 1010, laser transceiver 420 detects light from field of view 422. Sub-method 1002 further includes a step 1020 of processing the transceiver data acquired in step 1010 to evaluate the LIDAR signal quality. Step 1020 may evaluate one or more metrics indicative of the LIDAR signal quality, such as one or more of the signal-to-noise ratio, the duration and/or frequency of signal drop-outs, and saturation of the transceiver. In one example of step 1020, processor 240 executes a portion of LIDAR instructions 262 to evaluate the LIDAR signal quality of the transceiver data. Next, sub-method 1002 performs a step 1030. Step 1030 decides if the LIDAR signal quality is acceptable. In one example of step 1030, processor 240 executes a portion of LIDAR instructions 262 to compare one or more LIDAR signal quality metrics determined in step 1020 to respective threshold values. For example, step 1030 may require that the signal-to-noise ratio for the LIDAR signal is greater than two (or another suitable threshold).

In one embodiment, step 1030 separately evaluates the LIDAR signal quality for aerosol scattering and for molecular scattering. Step 1030 may find that both or only one of aerosol scattering based LIDAR signal and molecular scattering based LIDAR signal is acceptable.

If step 1030 decides that the LIDAR signal quality is not acceptable, sub-method 1002 proceeds to a step 1040 of discarding the transceiver data for this particular laser beam. If step 1030 decides that the LIDAR signal quality is acceptable, sub-method 1002 proceeds to a step 1050 of calculating transceiver-specific air data parameters from the LIDAR signal. Step 1050 may be performed by processor 240 through execution of a portion of LIDAR instructions 262.

Step 1050 may include one, two, or all of steps 1052, 1054, and 1056. In certain embodiments, step 1050 includes at least step 1052. Step 1052 calculates the velocity of air vehicle 190 along the direction of the laser beam, for example as outlined in U.S. Pat. No. 8,072,584. Step 1054 calculates the atmospheric temperature in overlap region 440, for example as outlined in U.S. Pat. No. 8,072,584. Step 1056 calculates the atmospheric pressure in overlap region 440, for example as outlined in U.S. Pat. No. 8,072,584. Step 1050 may obtain the transceiver-specific air data parameters based upon aerosol scattering and/or molecular scattering. When both aerosol scattering and molecular scattering data are available, step 1050 may generate separate transceiver values based upon aerosol scattering and molecular scattering, respectively. Alternatively, step 1050 may base any given transceiver-specific air data parameter (e.g., airspeed, temperature, or pressure) on either aerosol scattering or molecular scattering or on a combination thereof.

After performing sub-method 1002 for each of the at least three laser beams, method 1000 proceeds to a step 1060 of checking the consistency of the transceiver-specific air data parameters. Step 1060 discards any transceiver-specific air data parameter that is an outlier. Step 1060 may include one or both of steps 1062 and 1064. Step 1062 checks for consistency of transceiver-specific air data parameters obtained from different transceivers. In one example of step 1062, processor 240 executes a portion of LIDAR instructions 262 to (a) retrieve, from memory 250, transceiver-specific air data parameters associated with different transceivers as determined in step 1050, (b) compare these transceiver-specific air data parameters to each other, and (c) discard any transceiver-specific air data parameters determined to be an outlier. Step 1064 checks for consistency over time of transceiver-specific air data parameters obtained from the same transceiver. In one example of step 1064, processor 240 executes a portion of LIDAR instructions 262 to (a) retrieve, from memory 250, a time series of transceiver-specific air data parameters obtained in step 1050 from the same transceiver, (b) compare these transceiver-specific air data parameters to each other, and (c) discard any transceiver-specific air data parameters determined to be an outlier. Step 1064 may repeat this process for each of the laser beams processed in step 1050.

After discarding any outliers in step 1060, method 1000 proceeds to a step 1070 of calculating optically-based air data parameters based upon the transceiver-specific air data parameters determined in step 1050 and not discarded in step 1060. In embodiments of method 1000 that include step 1054, step 1070 may include a step 1072. In embodiments of method 1000 that include step 1056, step 1070 may include a step 1076. In embodiments of method 1000 that include step 1052, step 1070 may include a step 1080. Each of steps 1072, 1076, and 1080 may be performed by processor 240 by retrieving corresponding transceiver-specific air data parameters from memory 250 and executing a respective portion of LIDAR instructions 262.

Step 1072 determines the atmospheric temperature. If more than one transceiver-specific measure of the atmospheric temperature is obtained in step 1054 and retained in step 1060, step 1074 includes a step 1074 of determining the atmospheric temperature from multiple transceiver-specific atmospheric temperatures. In one embodiment, step 1074 calculates the atmospheric temperature as the average of the transceiver-specific atmospheric temperatures. This average may be a weighted average, for example with weights according to the LIDAR signal quality determined in step 1020, such that transceivers generating higher quality data are assigned greater weight. Step 1074 may determine a single estimate of the atmospheric temperature based upon (a) one or more transceiver-specific atmospheric temperatures based upon aerosol scattering and (b) one or more transceiver-specific atmospheric temperatures based upon molecular scattering.

Step 1076 determines the atmospheric pressure. If more than one transceiver-specific measure of the atmospheric temperature is obtained in step 1056 and retained in step 1060, step 1076 includes a step 1078 of determining the atmospheric pressure from multiple transceiver-specific atmospheric pressures. Step 1076 may calculate the atmospheric pressure as the average of the transceiver-specific atmospheric pressures. This average may be a weighted average, for example with weights according to the LIDAR signal quality determined in step 1020, such that transceivers generating higher quality data are assigned greater weight. Step 1078 may determine a single estimate of the atmospheric temperature based upon (a) one or more transceiver-specific atmospheric temperatures based upon aerosol scattering and (b) one or more transceiver-specific atmospheric temperatures based upon molecular scattering.

Step 1080 determines the airspeed. Step 1080 includes a step 1082 of determining if velocity data is available for more than three transceivers not in a common plane. If so, step 1080 proceeds to step 1084. Otherwise, step 1080 proceeds to step 1088. Step 1080 calculates the full vector speed utilizing the known geometry of the laser beams. In one example, step 1080 calculates the full vector speed of air vehicle 190 utilizing the known geometry of laser beams 310. If velocity data is available from more than three transceivers, step 1084 may include a step 1086 of fitting the full vector speed to the transceivers-specific velocities of step 1052. Step 1088 estimates that waterline velocity using the known laser beam geometry associated with each laser beam considered in step 1088. Step 1088 may include a step 1089 of assuming that the full vector velocity is predominantly axial. In one example of step 1088 implementing step 1089, step 1088 assumes that the velocity measured along each laser beam is the projection of the axial velocity onto the propagation direction of the laser beam. Step 1088 then inverts this assumed projection to generate an estimate of the waterline velocity. If velocity data is available from two transceivers, step 1088 may estimate the waterline velocity as an average of the two transceiver-specific velocities. This average may be weighted according to the LIDAR signal quality determined in step 1020. Alternatively, if velocity data is available from two transceivers, step 1088 may assume that the full vector speed is in a direction that is in the plane spanned by the two corresponding laser beams, so as to estimate a two-dimensional velocity vector. This may allow for an estimate of the waterline velocity as well as a velocity in one direction orthogonal to the waterline.

In one embodiment, step 1080 determines an airspeed (for example the full vector speed) from two separate estimates of this airspeed, wherein one of the two estimates is based upon aerosol scattering and the other estimate is based upon molecular scattering.

In certain embodiments, method 1000 further includes a step 1090 of communicating the optically-based air data parameters to a flight control system, such as flight control system 280.

Without departing from the scope hereof, method 1000 may be performed in parallel for aerosol scattering and molecular scattering to generate two estimates of each of one or more optically-based air data parameters, wherein one estimate is based upon aerosol scattering and the other estimate is based upon molecular scattering. Step 1090 may output both aerosol scattering based and molecular scattering based air-data parameters.

Also without departing from the scope hereof, step 1010 may be replaced by a step of receiving the LIDAR measurements from a third-party LIDAR module. In this case, method 1010 may be performed by data processing module 120 alone. Method 1000, without step 1010, may be encoded in LIDAR instructions 262.

Figure 11:
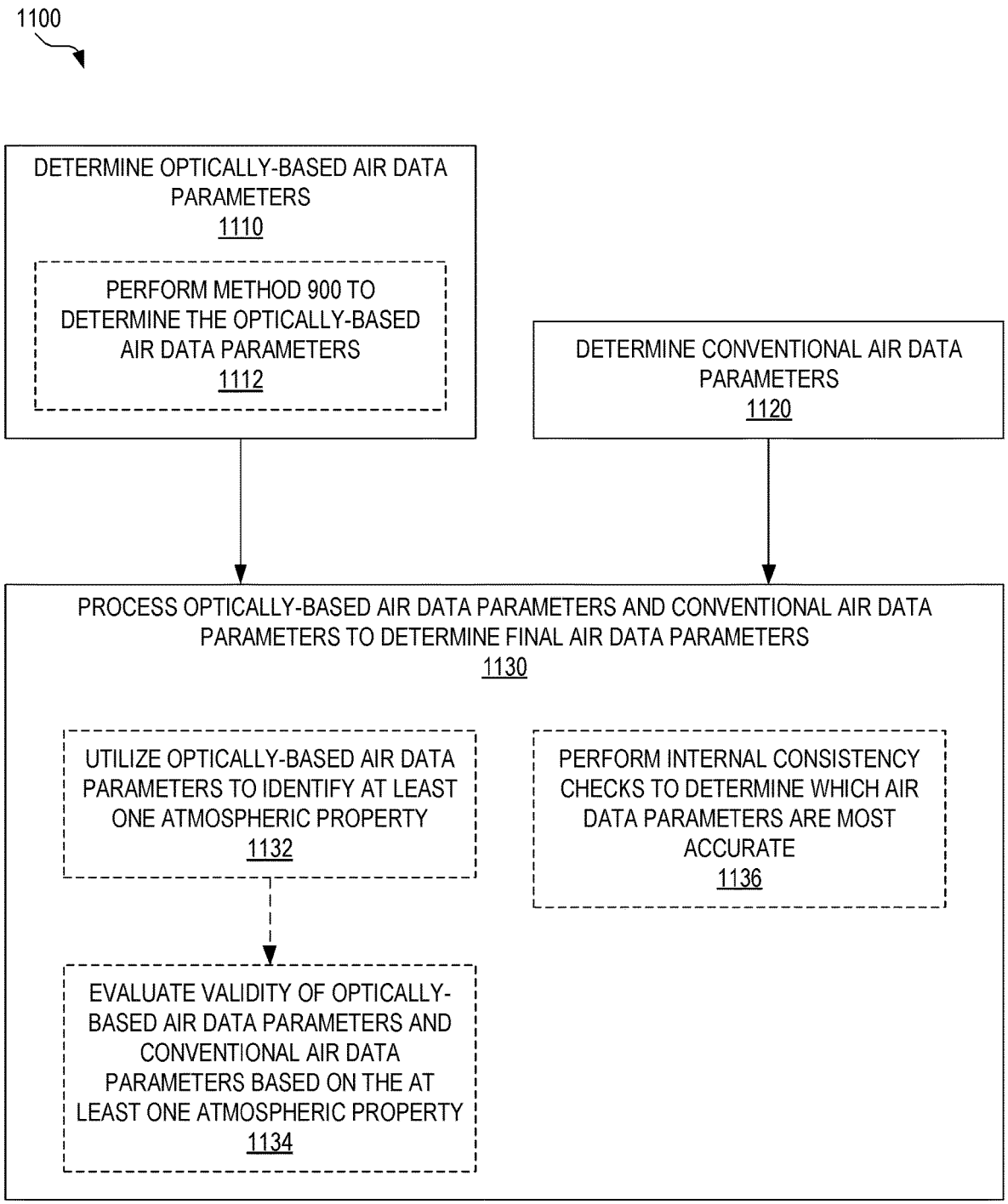
FIG. 11 illustrates a method for augmenting a conventional air data system with an optical air data system, according to an embodiment.

FIG. 11 illustrates one exemplary method 1100 for augmenting a conventional air data system with an optical air data system such as OADS 100. In a step 1100, method 1100 determines air data parameters from optical measurements. Step 1110 may implement a step 1112 of performing method 900 to determine optically-based air data parameters. In one example of step 1110, OADS 100 performs method 900.

In a step 1120, method 1100 determines conventional air data parameters based upon measurements by conventional sensors such as Pitot static tubes. In one example of step 1120, conventional sensor system 130 determines conventional air data parameters.

In a step 1130, method 1100 processes the optically-based air data parameters of step 1110 and the conventional air data parameters of step 1120 to determine final air data parameters to be used by a flight system. In one example of step 1130, voting module 282 processes (a) optical air data parameters received from data processing module 120 and (b) conventional air data parameters received from conventional sensor system 130, to determine final air data parameters. Step 1130 may utilize general knowledge about the validity of different types of air data under certain atmospheric conditions and/or evaluate the validity of different types of air data based upon the air data itself.

In one embodiment, step 1130 includes steps 1132 and 1134. Step 1132 utilizes optically-based air data parameters to identify at least one atmospheric property. In one example of step 1132, voting module 282 receives one or more air data parameters indicating a property of the atmospheric conditions. Step 1134 evaluates the validity of optically-based air data parameters and conventional air data parameters based on the at least one atmospheric property identified in step 1132. In one example of step 1134, voting module deselects air data parameters based upon measurements by a sensor type known to be unreliable under the atmospheric condition determined in step 1132. In an example of steps 1132 and 1134, voting module 282 receives, from data processing module 120, a high aerosol concentration and a temperature at or below freezing, and determines that air vehicle 190 is in an environment of icing conditions. Based upon this information, voting module 282 deselects data from Pitot static tubes since these are prone to fail in icing conditions. In another example of steps 1132 and 1134, voting module 282 receives, from data processing module 120, a high aerosol concentration and a high temperature, and determines that there is a lot of volcanic ash in the air surrounding air vehicle 190. Based upon this information, voting module 282 deselects data from airflow based conventional sensors such as pitot static tubes. In yet another example, steps 1132 and 1134 utilize the ratio of molecular scatter to aerosol scatter to determine an atmospheric property and select the most accurate air data based thereupon.

In another embodiment, step 1130 includes a step 1136 of performing internal consistency checks between different air data parameters to determine which air data parameters are most accurate.

Step 1130 may be implemented as machine-readable instructions encoded in non-transitory memory of voting module 282, and voting module 282 or flight control system 280 may include a processor that executes such machine-readable instructions to perform step 1130. In an embodiment, these machine-readable instructions are encoded in non-transitory memory and supplied as a stand-alone software product configured for installation on a third-party computer system. Without departing from the scope hereof, step 1130 may be a stand-alone method that takes as input optically-based air data parameters and conventional air data parameters.

Combinations of Features

Features described above as well as those claimed below may be combined in various ways without departing from the scope hereof. For example, it will be appreciated that aspects of one optical air data system or method described herein may incorporate or swap features of another optical air data system or method described herein. The following examples illustrate some possible, non-limiting combinations of embodiments described above. It should be clear that many other changes and modifications may be made to the systems herein without departing from the spirit and scope of this invention:

(A1) An OADS may include (a) a LIDAR module configured to emit at least three laser beams and measure a back-reflected component of each of the laser beams, and (b) a data processing module including a processor and machine-readable instructions that, when executed by the processor, fit at least one optically-based air data parameter to measurements by the LIDAR module of the back-reflected component to determine the at least one optically-based air data parameter.

(A2) In the OADS denoted as (A1), the at least three laser beams may include four laser beams, and the machine-readable instructions may include instructions that, when executed by the processor, fit the at least one optically-based air data parameter to measurements of the back-reflected component of all four laser beams to determine the at least one optically-based air data parameter.

(A3) In either of the OADSs denoted as (A1) and (A2), the at least three laser beams may include four laser beams, the LIDAR module may include four laser transceivers, each configured to generate a respective one of the four laser beams and measure the associated back-reflected component, and the machine-readable instructions may include instructions that, when executed by the processor, (i) determine if any of the laser transceivers is erroneous and (ii) fit the at least one optically-based air data parameter to measurements of the back-reflected component only of laser beams that are not erroneous.

(B1) An OADS may include (a) a LIDAR module configured to emit at least three laser beams and measure both aerosol scattering and molecular scattering of each of the laser beams, and (b) a data processing module including a processor and machine-readable instructions that, when executed by the processor, (i) determine two estimates of at least one optically-based air data parameter respectively based on the aerosol scattering and the molecular scattering and (ii) evaluate the two estimates to refine the at least one optically-based air data parameter.

(C1) An OADS for implementation on an air vehicle may include (a) a LIDAR module configured to emit at least three laser beams and measure both aerosol scattering and molecular scattering of each of the laser beams, and (b) a data processing module including a processor and machine-readable instructions that, when executed by the processor, determine (i) full vector speed of the air vehicle, (ii) atmospheric temperature at the air vehicle based upon the molecular scattering, and (iii) atmospheric pressure at the air vehicle based upon the molecular scattering.

(C2) In the OADS denoted as (C1), the machine-readable instructions may be configured to generate two estimates of the full vector speed based upon molecular scattering and aerosol scattering, respectively, and determine a refined full vector speed based upon the two estimates.

(C3) In either of the OADSs denoted as (C1) and (C2), the machine-readable instructions may be configured to evaluate accuracy of one of a plurality of air data parameters associated with the full vector speed, the atmospheric temperature, and the atmospheric pressure based upon another one of the plurality of air data parameters.

(C4) In any of the OADSs denoted as (C1) through (C3), the LIDAR module may have one or more fields of view for detection of back-reflected components of the laser beams due to one or both of aerosol scattering and molecular scattering, wherein the overlap between the field(s) of view and the laser beams is within two meters from the LIDAR module for short range LIDAR measurements.

(D1) An optical air data method may include obtaining LIDAR measurements from at least three laser beams and fitting at least one optically-based air data parameter to the LIDAR measurements to determine the at least one optically-based air data parameter.

(D2) In the optical air data method denoted as (D1), the step of fitting may include, when one or more of the at least three laser beams does not provide valid LIDAR measurements, fitting the least one optically-based air data parameter to remaining ones of the at least three laser beams.

(D3) In the optical air data method denoted as (D2), the step of fitting the at least one optically-based air data parameter to the remaining ones may include using known geometry of the laser beams to estimate velocity.

(D4) In either of the optical air data methods denoted as (D2) and (D3), the remaining ones of the at least three laser beams may be a single laser beam, and the at least one optically-based air data parameter may include a velocity, atmospheric pressure, and atmospheric temperature.

(E1) An optical air data method may include (a) obtaining molecular scattering LIDAR measurements and aerosol scattering LIDAR measurements from each of at least three laser beams, and (b) determining optically-based air data parameters including (i) atmospheric pressure and temperature based upon the molecular scattering LIDAR measurements and (ii) full vector speed based upon one or both of the molecular scattering LIDAR measurements and the aerosol scattering LIDAR measurements.

(E2) In the optical air data method denoted as (E1), the step of determining full vector speed may be based upon the molecular scattering LIDAR measurements at least at altitudes with insufficient aerosol concentration for obtaining valid aerosol scattering LIDAR measurements.

(E3) Either of the optical air data methods denoted as (E1) and (E2) may further include obtaining mechanical air data parameters and evaluating the optically-based air data parameters and the mechanical air data parameters to determine final air data parameters.

(E4) In the optical air data method denoted as (E3), the step of evaluating may include identifying at least one atmospheric property based upon the optically-based air data parameters, and evaluating validity of the optically-based air data parameters and the mechanical air data parameters based upon the at least one atmospheric property.

(E5) The optical air data method denoted as (E4) may further include discarding at least one of the mechanical air data parameters based upon the at least one atmospheric property.

(E6) In either of the optical air data methods denoted as (E4) and (E5), the at least one atmospheric property may include an aerosol mass density or an aerosol concentration.

(E7) In any of the optical air data methods denoted as (E1) through (E6), the step of obtaining may include measuring back-reflected components of the laser beams, the back-reflected components originating from scattering events within two meters of transceivers generating the laser beams, for short range LIDAR measurements.

(E8) In any of the optical air data methods denoted as (E1) through (E7), the step of determining may include determining lateral velocity and vertical velocity.

(F1) An optical air data system for an air vehicle may include (a) a LIDAR module configured to emit at least three laser beams, not all located in a common plane, and perform LIDAR measurements of a backscattered component of each of the laser beams, and (b) a data processing module including a processor and machine-readable instructions that, when executed by the processor, processes the LIDAR measurements to determine at least one optically-based air data parameter.

(F2) In the optical air data system denoted as (F1), an overlap between the laser beams and field of view of the LIDAR module may be within two meters from the LIDAR module to determine the at least one optically-based air data parameter within two meters from the air vehicle.

(F3) For each of the laser beams in the optical air data system denoted as (F2), the LIDAR module may include a photodetector having a field of view that overlaps with the respective laser beam within two meters from the LIDAR module.

(F4) In any of the optical air data systems denoted as (F1) through (F3), the machine-readable instructions may be configured to, when executed by the processor, perform steps of evaluating quality of the LIDAR measurements to select LIDAR measurements of acceptable quality, and determining the at least one optically-based air data parameter based only upon the LIDAR measurements of acceptable quality.

(F5) In the optical air data system denoted as (F4), the machine-readable instructions may be configured to, when executed by the processor and in the step of determining, determine an airspeed of the air vehicle, atmospheric temperature, and atmospheric pressure.

(F6) In either of the optical air data systems denoted as (F4) and (F5), the machine-readable instructions may be configured to, when executed by the processor and in the step of determining, determine (i) when LIDAR measurements of acceptable quality are available for each of more than three laser beams, not all located in a common plane, full vector speed of the air vehicle, and (ii) when LIDAR measurements of acceptable quality are available for only one or two of the laser beams, an estimate of waterline velocity of the air vehicle.

(F7) In any of the optical air data systems denoted as (F1) through (F6), the at least three laser beams may include four laser beams.

(F8) In the optical air data system denoted as (F7), the machine-readable instructions may be configured to, when executed by the processor, perform steps of evaluating quality of LIDAR measurements based upon the backscattered components to select LIDAR measurements of acceptable quality and, when the LIDAR measurements are of acceptable quality for each of the four laser beams, calculating full vector speed of air vehicle based upon the LIDAR measurements of all of the four laser beams.

(F9) In any of the optical air data systems denoted as (F1) through (F8), the machine-readable instructions may be configured to, when executed by the processor, fit at least one optically-based air data parameter to the LIDAR measurements to determine the at least one optically-based air data parameter.

(F10) In any of the optical air data systems denoted as (F1) through (F9), the LIDAR module may be configured to obtain, for each of the laser beams, first LIDAR measurements based upon both aerosol scattering and second LIDAR measurements based upon molecular scattering.

(F11) In the optical air data system denoted as (F10), the machine-readable instructions may be configured to, when executed by the processor, perform steps of determining two estimates of the at least one optically-based air data parameter respectively based upon the first LIDAR measurements and the second LIDAR measurements, and evaluating the two estimates to refine the at least one optically-based air data parameter.

(F12) In the optical air data system denoted as (F11), the machine-readable instructions may be configured to, when executed by the processor, perform steps of generating two estimates of the full vector speed respectively based upon the first LIDAR measurements and the second LIDAR measurements, and determining a refined full vector speed based upon the two estimates.

(F13) In any of the optical air data systems denoted as (F10) through (F12), the machine-readable instructions may be configured to, when executed by the processor, determine (i) full vector speed of the air vehicle, (ii) atmospheric temperature at the air vehicle based upon the molecular scattering, and (iii) atmospheric pressure at the air vehicle based upon the molecular scattering.

(F14) In any of the optical air data systems denoted as (F1) through (F13), the machine-readable instructions may be configured to, when executed by the processor and based upon the LIDAR measurements, perform steps of (1) determining full vector speed of the air vehicle, atmospheric temperature, and atmospheric pressure, and (2) evaluating accuracy of one of the full vector speed, the atmospheric temperature, and the atmospheric pressure based upon another one of the plurality of air data parameters.

(F15) Any of the optical air data systems denoted as (F1) through (F14) may being implemented in an air vehicle that further includes a mechanical sensor system, for generating at least one mechanical air data parameter, and a flight control system for at least partly controlling operation of the air vehicle.

(F16) In the optical air data system denoted as (F15), the flight control system may include a voting module for selecting at least one final air data parameter from the at least one optically-based air data parameter and the at least one mechanical air data parameter to control operation of the air vehicle.

(G1) A method for determining air data parameters for an air vehicle may include obtaining LIDAR measurements from at least three laser beams not located in a common plane, and processing the LIDAR measurements to determine at least one optically-based air data parameter.

(G2) In the method denoted as (G1), the step of obtaining may include obtaining the LIDAR measurements from scattering events within two meters from the air vehicle to determine the at least one optically-based air data parameter within two meters from the air vehicle.

(G3) In either or both of the methods denoted as (G1) and (G2), the step of processing may include determining (a) atmospheric pressure and temperature from LIDAR measurements based upon molecular scattering and (b) full vector speed from one or both of LIDAR measurements based upon aerosol scattering and LIDAR measurements based upon molecular scattering.

(G4) In the method denoted as (G3), the step of determining may include determining the full vector speed from the LIDAR measurements based upon molecular scattering at least at altitudes with insufficient aerosol concentration for the LIDAR measurements based upon molecular scattering to provide valid air data parameters.

(G5) Any of the methods denoted as (G1) through (G4) may further include obtaining at least one mechanical air data parameter, and evaluating the at least one optically-based air data parameter and the at least one mechanical air data parameter to determine at least one final air data parameter.

(G6) In the method denoted as (G5), the step of evaluating may include identifying at least one atmospheric property based upon the at least one optically-based air data parameter, and evaluating validity of the at least one optically-based air data parameter and the at least one mechanical air data parameter based upon the at least one atmospheric property.

(G7) The method denoted as (G6) may further include discarding at least one mechanical air data parameter based upon the at least one atmospheric property.

(G8) In either of the methods denoted as (G6) and (G7), the at least one atmospheric property may include at least one of an aerosol mass density and an aerosol concentration.

(G9) In any of the methods denoted as (G1) through (G8), the step of processing may include evaluating quality of the LIDAR measurements to select LIDAR measurements of acceptable quality, and generating the at least one optically-based air data parameter based only upon the LIDAR measurements of acceptable quality.

(G10) In the method denoted as (G9), the step of determining may include (a) when LIDAR measurements of acceptable quality are available for each of more than three laser beams, not all located in a common plane, determining full vector speed of the air vehicle, and (b) when LIDAR measurements of acceptable quality are available for only one or two of the laser beams, estimating waterline velocity of the air vehicle.

(G11) In the method denoted as (G10), the step of estimating waterline velocity may include assuming that the air vehicle is predominantly traveling in axial direction.

(G12) In any of the methods denoted as (G1) through (G11), the step of obtaining may include obtaining LIDAR measurements from four laser beams not all located in a common plane, for improved redundancy.

(G13) In the method denoted as (G12), the step of determining may include evaluating quality of the LIDAR measurements to select LIDAR measurements of acceptable quality and, when the LIDAR measurements are of acceptable quality for each of the four laser beams, calculating full vector speed of air vehicle based upon the LIDAR measurements of all of the four laser beams.

(G14) In any of the methods denoted as (G1) through (G13), the step of processing may include fitting at least one optically-based air data parameter to the LIDAR measurements to determine the at least one optically-based air data parameter.

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and systems, which, as a matter of language, might be said to fall therebetween.

What is claimed is:

1. An optical air data system for an air vehicle, comprising:
a LIDAR module configured to emit at least three laser beams, not all located in a common plane, and perform LIDAR measurements of a backscattered component of each of the laser beams; and
a data processing module including a processor and machine-readable instructions that, when executed by the processor, processes the LIDAR measurements to determine at least one optically-based air data parameter;
wherein, for each of the laser beams, the LIDAR module includes a photodetector having a field of view that overlaps with the respective laser beam within two meters from the LIDAR module;
where the machine-readable instructions are configured to, when executed by the processor, perform steps of:
evaluating quality of the LIDAR measurements to select LIDAR measurements of acceptable quality; and
determining the at least one optically-based air data parameter based only upon the LIDAR measurements of acceptable quality;
the machine-readable instructions being configured to, when executed by the processor and in the step of determining, determine:
when LIDAR measurements of acceptable quality are available for each of more than three laser beams, not all located in a common plane, a full vector speed of the air vehicle; and
when LIDAR measurements of acceptable quality are available for only one or two of the laser beams, an estimate of waterline velocity of the air vehicle, the estimate of waterline velocity from velocity measured by the one or two remaining beams and known geometry of those beams.

2. The optical air data system of claim 1, the machine-readable instructions being configured to, when executed by the processor and in the step of determining, determine an airspeed of the air vehicle, atmospheric temperature, and atmospheric pressure.

3. The optical air data system of claim 2, the at least three laser beams including four laser beams.

4. The optical air data system of claim 3, the machine-readable instructions being configured to, when executed by the processor, perform steps of:
evaluating quality of LIDAR measurements based upon the backscattered components to select LIDAR measurements of acceptable quality; and
when the LIDAR measurements are of acceptable quality for each of the four laser beams, calculating full vector speed of air vehicle based upon the LIDAR measurements of all of the four laser beams.

5. The optical air data system of claim 1, the machine-readable instructions being configured to, when executed by the processor, fit at least one optically-based air data parameter to the LIDAR measurements to determine the at least one optically-based air data parameter.

6. The optical air data system of claim 1, the LIDAR module being configured to obtain, for each of the laser beams, first LIDAR measurements based upon both aerosol scattering and second LIDAR measurements based upon molecular scattering.

7. The optical air data system of claim 6, the machine-readable instructions being configured to, when executed by the processor, perform steps of:
determining two estimates of the at least one optically-based air data parameter respectively based upon the first LIDAR measurements and the second LIDAR measurements; and
evaluating the two estimates to refine the at least one optically-based air data parameter.

8. The optical air data system of claim 7, the machine-readable instructions being configured to, when executed by the processor, perform steps of:
generating two estimates of the full vector speed respectively based upon the first LIDAR measurements and the second LIDAR measurements; and
determining a refined full vector speed based upon the two estimates.

9. The optical air data system of claim 6, the machine-readable instructions being configured to, when executed by the processor, determine (a) full vector speed of the air vehicle, (b) atmospheric temperature at the air vehicle based upon the molecular scattering, and (c) atmospheric pressure at the air vehicle based upon the molecular scattering.

10. The optical air data system of claim 1, the machine-readable instructions being configured to, when executed by the processor and based upon the LIDAR measurements, perform steps of:
determining full vector speed of the air vehicle, atmospheric temperature, and atmospheric pressure; and
evaluating accuracy of one of the full vector speed, the atmospheric temperature, and the atmospheric pressure based upon another one of the plurality of air data parameters.

11. The optical air data system of claim 1, being implemented in an air vehicle that further includes:
a mechanical sensor system for generating at least one mechanical air data parameter; and
a flight control system for at least partly controlling operation of the air vehicle, the flight control system including a voting module for selecting at least one final air data parameter from the at least one optically-based air data parameter and the at least one mechanical air data parameter to perform said controlling.

12. A method for determining air data parameters for an air vehicle, comprising:
obtaining LIDAR measurements from at least three laser beams not located in a common plane; and
processing the LIDAR measurements to determine at least one optically-based air data parameter;
the step of processing comprising:
evaluating quality of the LIDAR measurements to select LIDAR measurements of acceptable quality; and
generating the at least one optically-based air data parameter based only upon the LIDAR measurements of acceptable quality; and
when LIDAR measurements of acceptable quality are available for each of at least three laser beams, not all located in a common plane, determining a full vector speed of the air vehicle; and
when LIDAR measurements of acceptable quality are available for only one or two of the laser beams, estimating waterline velocity of the air vehicle, the estimate of waterline velocity from velocity measured by the one or two remaining beams and known geometry of the one or two remaining beams.

13. The method of claim 12, the step of obtaining comprising obtaining the LIDAR measurements from scattering events within two meters from the air vehicle to determine the at least one optically-based air data parameter within two meters from the air vehicle.

14. The method of claim 12, the step of processing comprising determining (a) atmospheric pressure and temperature from LIDAR measurements based upon molecular scattering and (b) full vector speed from one or both of LIDAR measurements based upon aerosol scattering and LIDAR measurements based upon molecular scattering.

15. The method of claim 14, the step of determining comprising determining the full vector speed from the LIDAR measurements based upon molecular scattering at least at altitudes with insufficient aerosol concentration for the LIDAR measurements based upon aerosol scattering to provide valid air data parameters.

16. The method of claim 12, further comprising:
obtaining at least one mechanical air data parameter; and
evaluating the at least one optically-based air data parameter and the at least one mechanical air data parameter to determine at least one final air data parameter.

17. The method of claim 16, the step of evaluating comprising:
identifying at least one atmospheric property based upon the at least one optically-based air data parameter; and
evaluating validity of the at least one optically-based air data parameter and the at least one mechanical air data parameter based upon the at least one atmospheric property.

18. The method of claim 17, further comprising discarding at least one mechanical air data parameter based upon the at least one atmospheric property.

19. The method of claim 17, the at least one atmospheric property including at least one of an aerosol mass density and an aerosol concentration.

20. The method of claim 12, the step of estimating waterline velocity comprising assuming that the air vehicle is predominantly traveling in axial direction.

21. The method of claim 12, the step of obtaining comprising obtaining LIDAR measurements from four laser beams not all located in a common plane, for improved redundancy.

22. The method of claim 21, the step of determining comprising:
evaluating quality of the LIDAR measurements to select LIDAR measurements of acceptable quality; and
when the LIDAR measurements are of acceptable quality for each of the four laser beams, calculating full vector speed of air vehicle based upon the LIDAR measurements of all of the four laser beams.

23. The method of claim 12, the step of processing comprising fitting at least one optically-based air data parameter to the LIDAR measurements to determine the at least one optically-based air data parameter.

\* \* \* \* \*

UNITED STATES PATENT AND TRADEMARK OFFICE
CERTIFICATE OF CORRECTION

PATENT NO. : 11,300,584 B2
APPLICATION NO. : 16/315618
DATED : April 12, 2022
INVENTOR(S) : Loren M. Caldwell et al.

It is certified that error appears in the above-identified patent and that said Letters Patent is hereby corrected as shown below:

In the Claims

At Column 19 Line 41:
-- estimate of waterline velocity from velocity measured by the one or two remaining beams and known geometry of those beams. --

Should read:
-- estimate of waterline velocity determined from velocity measured by the one or two remaining beams and known geometry of those beams. --

Signed and Sealed this
Thirteenth Day of February, 2024

Katherine Kelly Vidal
*Director of the United States Patent and Trademark Office*